(12) United States Patent
Zhang et al.

(10) Patent No.: US 7,158,539 B2
(45) Date of Patent: Jan. 2, 2007

(54) ERROR RESILIENT WINDOWS MEDIA AUDIO CODING

(75) Inventors: Qian Zhang, Hubei (CN); Jianping Zhou, Beijing (CN); Wenwu Zhu, Basking Ridge, NJ (US)

(73) Assignee: Microsoft Corporation, Redmond, WA (US)

( * ) Notice: Subject to any disclaimer, the term of this patent is extended or adjusted under 35 U.S.C. 154(b) by 994 days.

(21) Appl. No.: 10/125,280

(22) Filed: Apr. 16, 2002

(65) Prior Publication Data

US 2003/0193900 A1  Oct. 16, 2003

(51) Int. Cl.
  H04J 3/24  (2006.01)
(52) U.S. Cl. ..................... 370/473; 370/470
(58) Field of Classification Search ........ 370/470–474; 360/55–64, 234, 97.01–98; 369/13.56, 16, 369/30.16–30.35, 124.01–124.09, 93–97, 369/47.15–47.27; 710/29–30
See application file for complete search history.

(56) References Cited

U.S. PATENT DOCUMENTS

| | | | |
|---|---|---|---|
| 5,526,353 A | 6/1996 | Henley et al. | |
| 5,856,973 A | 1/1999 | Thompson | |
| 6,031,874 A | 2/2000 | Chennakeshu et al. | |
| 6,249,319 B1 | 6/2001 | Post | |
| 6,367,049 B1 | 4/2002 | Van Dijk et al. | |
| 6,501,397 B1 | 12/2002 | Radha et al. | |
| 6,580,834 B1 | 6/2003 | Li et al. | |
| 6,757,659 B1 * | 6/2004 | Tanaka et al. | 704/501 |
| 6,801,707 B1 * | 10/2004 | Harumoto et al. | 386/46 |
| 6,934,679 B1 | 8/2005 | Zhou et al. | |
| 2001/0022761 A1 * | 9/2001 | Sekii | 369/32 |
| 2002/0021761 A1 | 2/2002 | Zhang et al. | |
| 2003/0079222 A1 * | 4/2003 | Boykin et al. | 725/31 |

OTHER PUBLICATIONS

"A Class of Reversible Variable Length Codes for Rubust Image and Video Coding", Jiantao Wen and John D. Villasenor, 4 pages.
"Error Resilient Scalable Audio Coding (ERSAC) For Mobile Applications", Jianpin Zhou, Qian Zhang, Zixang Xiong and wEnwu Zhu, 4 pages.

* cited by examiner

*Primary Examiner*—Doris H. To
*Assistant Examiner*—Thai Hoang
(74) *Attorney, Agent, or Firm*—Lee & Hayes, PLLC

(57) ABSTRACT

A unique sync mark is applied by an encoder to the beginning of each frame in a data packet of a Windows Media™ Audio bitstream by a Microsoft® Windows Media™ Audio (WMA) codec. The WMA decoder handles errors at the frame level for each data packet. When a frame in a data packet of a WMA file is corrupted, the decoder can continue to decode the next frame by searching for the next sync mark at the beginning of the next frame. Accordingly, error propagation is confined to a single frame and the decoder can simultaneously handle bit errors and packet erasures when decompressing a received audio bitstream.

16 Claims, 4 Drawing Sheets

ERROR RESILIENT WINDOWS MEDIA AUDIO CODING

TECHNICAL FIELD

The present invention relates to systems and methods for streaming media (e.g. audio) over a network, such as the Internet.

BACKGROUND OF THE INVENTION

With the emerging of 2.5G (GPRS) and the third generation (3G) (CDMA2000 and WCDMA) wireless technology, streaming high-fidelity audio over a wireless channel has become a reality, where the audio data stream includes a sequence of sample values that are converted to a pitch and volume to produce continuously varying sound. Internet Protocol (IP) based architecture is promising to provide the opportunity for next-generation wireless services such as voice, high-speed data, Internet access, and audio and video streaming on an all IP network. In GPRS and 3G, however, there are still residual bits errors in the decoder of an audio coder-decoder (codec) although a wireless network has good error control capability. As such, the transmission of audio data streams across wireless networks still remains a challenge due to the limited varying bandwidth and the time-varying error-prone environment, including packet losses and random bit errors. Therefore, it is desirable that an audio decoder will have a capability of handling random bit errors.

Considering the limited bandwidth in wireless networks, efficient compression techniques could be applied to the audio signals at the cost of the sensitivity to the transmission errors. Bit errors usually have severe adverse effects on the decompression of the received stream, and can even make the decoder crash if not handled properly. To cope with errors on wireless networks, error resilience (ER) techniques can be used. Error resilience techniques at the source decoding level can detect and locate errors, support resynchronization, and prevent the loss of entire information. With the aide of error resilient tools, acceptable audio quality can be obtained at a lower bit error rate, like $10^{-5}$. But the bit error rate in the wireless channel can be much higher, which results in poorly reconstructed quality only with error resilience tools. Thus, to cope with errors on the wireless networks, techniques other than ER techniques, such as error protection techniques might also be useful to increase robust audio transmission.

The characteristics of audio and video are different. As such, the challenges of error resilience for video coding differ from that of audio coding. While there is a strong correlation between adjacent video frames that can be exploited to recover the data corrupted in the transmission, there is almost no correlation between adjacent audio frames in the time domain. Moreover, audio coding artifacts caused by corrupted frames are esthetically unsatisfactory for human ears. Accordingly, error resilient schemes for video coding cannot be directly ported to audio coding.

The Microsoft® Windows Media™ Audio (WMA) codec (coder—decoder), which is provided by Microsoft Corporation of Redmond, Wash., USA, is a high-quality audio codec optimized for both voice and music. The WMA codec uses low- to high-range bit rates and produces smaller files and encodes and decodes faster than earlier audio codecs. Files encoded with the WMA audio codec can be downloaded faster than comparable files, and can be stored in less space. As such, the WMA codec provides near-CD-quality sound at less of the bandwidth required by earlier codecs. The WMA codec is useful for a variety of mono and stereo audio formats for different network bandwidths using a WMA file. The WMA codec is designed to handle a plurality of types of audio content, from low-bandwidth 8-kilohertz (kHz) speech to 48-kHz stereo music. The WMA codec is resistant to degradation due to packet loss because it does not use interframe memory. As such, it has a tolerance that is desirable for use with streaming content. A WMA file, which typically has the ".wma" file name extension, is a special type of advanced streaming format (ASF) file for use with audio content encoded with the WMA codec. As seen in FIG. 1, the Windows Media audio file is made up of data packets, each of which has a packet header and a plurality of frames. Included in the packet header are a packet sequence number, a frame count number, and a left over bits number.

While the WMA codec provides the foregoing advances over earlier codecs, bit errors still can be a problematic for the decoder. Several approaches can be used to deal with error resilience for WMA streaming, including use of a Header Extension Code (HEC), using Reversible Variable Length Codes (RVLC), and using Data Partitioning. A HEC can be used to reduce the sensitivity of the most important information that the decoder needs to be able to decode the audio bitstream. To use the HEC, in each packet, an additional 1-bit field is introduced. If this bit is set, the important header information that describes the audio frame is repeated in the audio packet. In WMA, each frame is only correlated to the previous frame and is independent of other frames. Thus, HEC is of minimal use for error resiliency in that there is no such important header information that can be identified by the WMA decoder for each frame.

RVLCs are special variable length codes that can be used for decoding from both the forward and reverse directions using their properties of suffix and prefix. However, RVLCs require a significant amount of memory and can cause a long time delay. Therefore, it is not preferable to use RVLC in real-time decoding on mobile devices.

Data partitioning can be used to limit the error propagation between different data segments by partitioning the data. An audio bitstream is composed of several data segments, among which there are Constant Length Codes (CLC) and Variable Length Codes (VLC). The errors in the VLC may propagate into the CLC parts if no precautions are taken. In WMA, a data packet usually consists of a few frames. Each frame is composed of one or multiple sub-frames. Each sub-frame comprises a header and a payload. While the sub-frame header comprises many CLCs and possible two types of VLCs, the sub-frame payload consists of run-level VLCs and sign bits. These different data segments are interleaved together. When any of the data segments is discarded, the rest of the data segments are useless. Therefore, it is very difficult to apply data partitioning to WMA.

When a bit error is encountered by the decoder of the WMA codec, the decoder will either discard the entire data packet or just the remainder of data packet. It would be an advance in the art to provide an error resilient audio coding technique to address these problematic errors. Consequently, there is a need for improved methods, computer-readable medium, data structure, and systems that can provide such a capability.

BRIEF SUMMARY OF THE INVENTION

This invention proposes an error resilient scheme for audio streaming over a channel, such as over the Internet or wireless networks. This scheme achieves error resilience by applying a unique sync mark in the beginning of each frame in a data packet of a Windows Media Audio bitstream. When a frame in a data packet of a Windows Media Audio file is corrupted, a Microsoft® Windows Media™ Audio (WMA) codec (coder-decoder) can continue to decode the next frame by searching for the next sync mark at the beginning of the next frame. As such, the WMA codec is able to handle errors at the frame level for each data packet. Accordingly, error propagation is confined to a single frame and the decoder can simultaneously handle bit errors and packet erasures when decompressing a received audio bitstream.

An inventive method encodes streaming data into data packets with an encoding algorithm. Each data packet includes a packet header and one or more frames and each frame is contiguous with and proceeded by a predetermined unique bit sequence that is not used in the encoding algorithm to encode the streaming data.

DETAILED DESCRIPTION OF THE PREFERRED EMBODIMENTS

Figure 1:
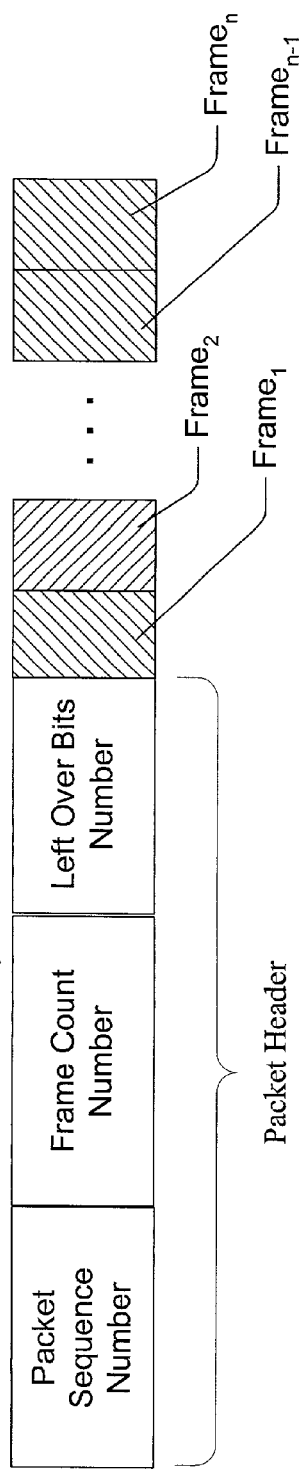
FIG. 1 is an overview for explaining a data packet structure of a conventional Microsoft® Windows Media™ Audio (WMA) data stream in any of a variety of information mediums, such as a recordable/reproducible compact disc (CD).
Figure 2:
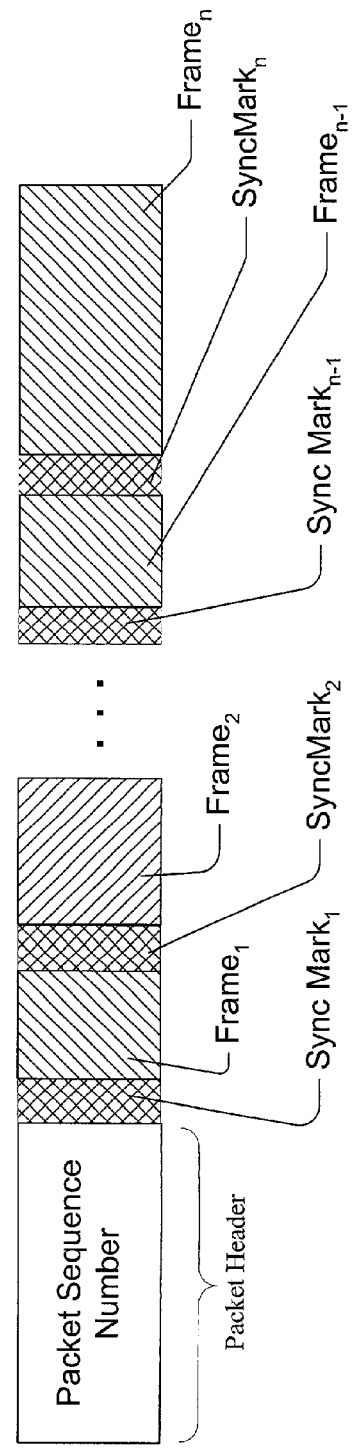
FIG. 2 is an overview, in accordance with an embodiment of the present invention, for explaining a data packet structure of a WMA data stream in any of a variety of information mediums, such as a recordable/reproducible compact disc (CD).

FIG. 2 shows a packet structure for a file that can be used by a Microsoft® Windows Media™ Audio (WMA) codec (coder-decoder). As seen in FIG. 2, a sync mark is inserted at the beginning of each frame in a data packet of a WMA file. The WMA codec is thereby error resilient to handle errors at the frame level by searching for the sync mark at the beginning of the next frame in the data packet. The packet header seen in FIG. 2 is shorter than that seen in FIG. 1. Specifically, the packet header in FIG. 1 includes a packet sequence number, a frame count number, and a leftover bits number for the data packet. Conversely, the packet header seen in FIG. 2 includes the packet sequence number while omitting the other fields. The frame count number and the left over bits number fields can be omitted from the packet header in FIG. 2 because these fields can be inferred from the sync marks that respectively proceed each frame in the data packet.

In order to make the format of the data packet for a WMA file to be backward compatible, it is desirable to add the sync mark in the coding mode. It is also desirable that the WMA decoder maintain the sync mark as an error-resilience bit that can be added as an optional feature.

The sync mark, which servers as a contiguous boundary around each frame, will preferably have an exclusive bit pattern. Although the WMA codec does not have invalid codes in the VLC code trees, the sync mark can be made to be unique by using a special bit pattern that will be exclusive in the bitstream of a data packet. By way of example and not by way of limitation, the special bit pattern for the sync mark can be an all zero bit string, which can be denoted by a zero code.

In order to make a zero code sync mark unique for the WMA codec, the length of the sync mark will preferably be larger than the number of consecutive zeroes in all of the variable length codes. The properties of all Huffman VLC tables are given in the Table, below.

TABLE

| Huffman VLC | Max. No. of consecutive zeroes | | | Zero code length | Code Length | |
|---|---|---|---|---|---|---|
| | Begin | Middle | Ending | | Min. | Max. |
| Mask-VLC | 1 | 4 | 5 | 1 | 1 | 19 |
| Noise-VLC | 10 | 9 | 10 | 10 | 3 | 13 |
| VLC-16-Mono | 2 | 7 | 8 | 2 | 2 | 21 |
| VLC-16-Stereo | 8 | 7 | 8 | 8 | 2 | 18 |
| VLC-44Q-Mono | 2 | 8 | 9 | 2 | 2 | 20 |
| VLC-44Q-Stereo | 4 | 10 | 11 | 4 | 2 | 19 |
| VLC-44O-Mono | 2 | 12 | 13 | 2 | 2 | 22 |
| VLC-44O-Stereo | 2 | 8 | 9 | 2 | 2 | 20 |

In the Table, the first three columns present the maximum number of the consecutive zeroes in the beginning, the maximum number of consecutive zeroes that is neither the beginning nor the end but rather in the middle, and ending of the variable length codes in each VLC table, respectively. The fourth column of the Table presents the length of a zero code in each VLC table. The last two columns present the minimum and maximum code length of each VLC table, respectively. From the first three columns of the Table, it can be seen that the maximum number of consecutive zeroes in all variable length codes is thirteen (13). Moreover, the maximum length of the constant length codes (CLC) in the WMA codec is also thirteen (13). Therefore, one special bit pattern that can be selected in order to make the sync mark unique is a string of fourteen (14) zeroes. An example procedure by which a decoder of a WMA codec can search for a sync mark in a data packet is seen in pseudo code in Part A of the Appendix.

Although there are no fourteen (14) consecutive zero characters in a single code, fourteen (14) consecutive zeroes may still occur when multiple codes are concatenated together. Accordingly, it is desirable to preserve the uniqueness of a sync mark consisting of a string of fourteen (14) zeroes in the encoding processes. To do so, other characters can be added to the codes. By way of example and not by way of limitation, the coder of the WMA codec can add a single occurrence of the "1" character among the codes in the encoding process to guarantee the uniqueness of the sync mark, which is referred to herein as 'bit stuffing'. An example stuffing procedure is seen in pseudo code in Parts B and C of the Appendix.

In order to perform bit stuffing, a count is first made of the number of consecutive zeroes in the ending of the current encoded bitstream, which is denoted by cZeroBitsEnd in Parts B and C of the Appendix. Then another count is made of the maximum number of the consecutive zeroes in the beginning of the next coming code, which is denoted by cMaxZeroBitsBegin. If the next coming code is a constant length code (CLC), cMaxZeroBitsInBegin is the length of the next coming code. Otherwise, cMaxZeroBitsInBegin is the maximum number of the consecutive zeroes in the beginning of all variable length codes in the beginning of the VLC table, which is shown in the first column of the Table. If the sum of cZeroBitsEnd and cMaxZeroBitsBegin is no less than fourteen (14), a stuffing "1" bit is added. Before the decoder reads a code, the decoder should check in advance to ascertain whether there is a stuffing "1" bit. If so, the decoder reads a bit from the bit stream. It is contemplated, however, the foregoing bit stuffing procedure will occur only as a statistical rarity and will thus incur little overhead.

The error resilience technique for the WMA codec can provide additional error-detection capabilities described as follows. As set forth above and seen in FIG. 2, the sync mark sets the beginning of each frame in a data packet. As such, each frame is bounded or circumscribed by a pair of sync marks, with the exception of the last frame in a data packet. The WMA decoder can thus refer to the data between two sync marks as being a "perfect" frame. Accordingly, if there is an error in a frame of data packet, the error can not propagate to the next frame.

It is desirable the decoder of the WMA codec function expeditiously. To save the decoder time in searching the sync mark, it is desirable that the coder of the WMA codec make the sync mark to be byte-aligned. Consequently, the frames will also be byte-aligned. As such, a bit stuffing procedure may be desirable at the end of each frame in a data packet. Some bits can be stuffed at the end of each frame so that the added bits place the next sync mark at the beginning of the next byte. By way of example and not by way of limitation, stuffing bits can be added in such a way that the first stuffed bit is the "1" character and the other stuffed bits are zeroes. Accordingly, the decoder of the WMA codec will be able to detect the bit error.

It is desirable that the decoder of the WMA codec excel at error detection. To do so, the decoder can detect errors by detecting the stuffed characters by the decoder, such as the stuffed "1" character discussed above.

The procedure for handling bit errors adopted by the decoder of the WMA codec is as follows. When a bit error is detected, the decoder will discard the current frame of the data packet and go to the next frame by searching for the next sync mark. Frames in the data packet are independent of each other except two parameters about the number of samples. If the current frame is corrupted, their default values are used for the next frame instead. Given the foregoing, a maximum of two (2) frames will be discarded by the decoder in a worst case scenario. It is contemplated, however, that the discarding of two (2) frames which occurs only as a statistical rarity.

In sum, the coder of a WMA codec can insert a sync mark at the beginning of each frame in a data packet so that the decoder can use the sync mark to find next the available decoding unit when a random bit error occurs. The decoder can thus confine the error propagations between decoding units. In that a WMA bitstream is composed of many frames, the sync mark ensures that error propagation will be confined across frames. When a frame is corrupted, the decoder can continue to decode the next frame by searching for the corresponding sync mark. While conventional WMA codecs handle errors at the packet level, the inventive WMA codec handles errors at frame level. As such, error resilience is accomplished with the result that audio is rendered such that pauses or artifacts tend to be imperceptible to common listeners.

General Network Structure

Figure 3:
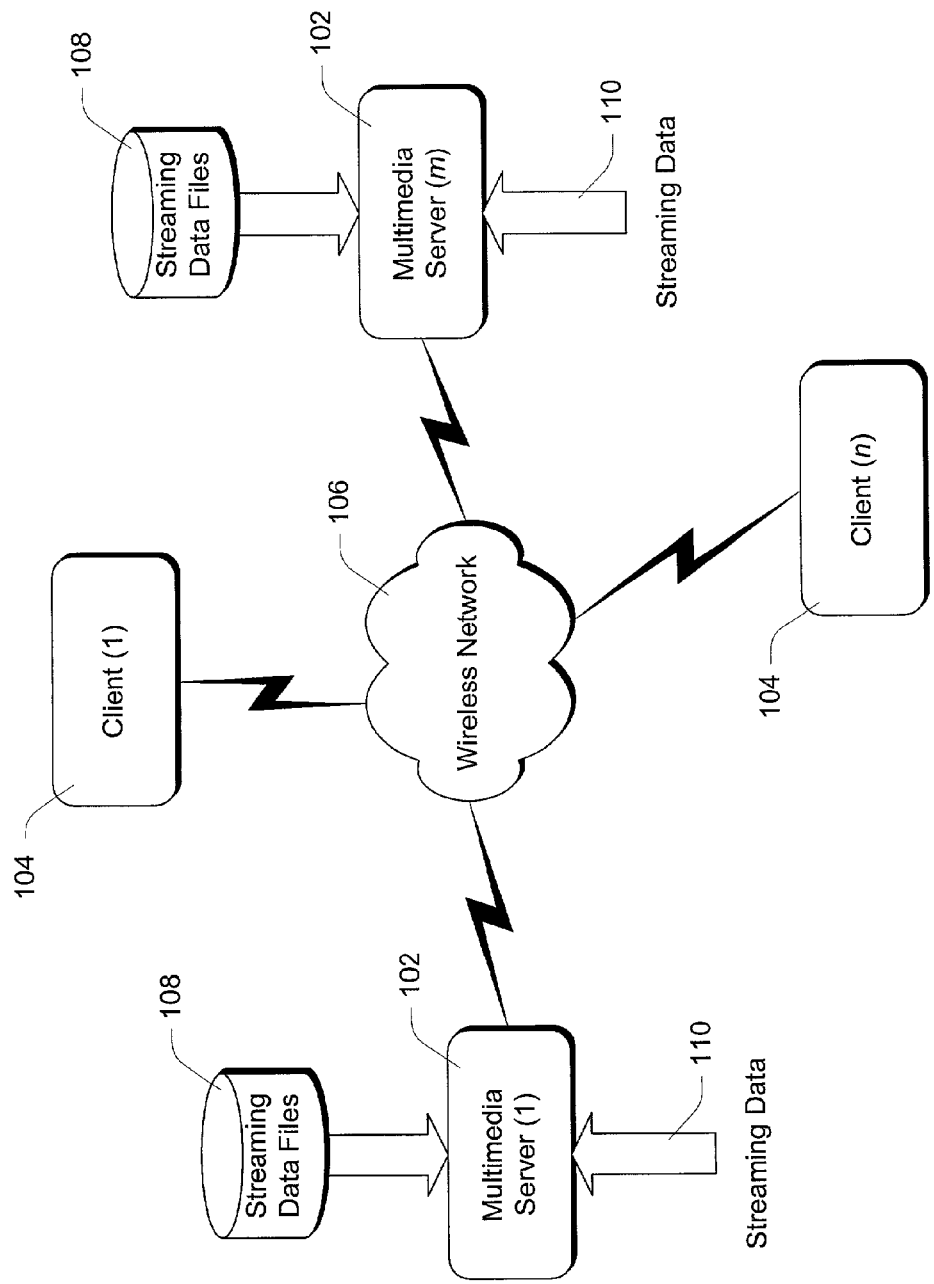
FIG. 3 is a block diagram in accordance with an embodiment of the present invention, of a networked client/server system.

FIG. 3 shows a client/server network system and environment in accordance with the invention. Generally, the system includes one or more (m) network server computers 102, and one or more (n) network client computers 104. The computers communicate with each other over a data communications network, which in FIG. 1 includes a wireless network 106. The data communications network might also include the Internet or local-area networks and private wide-area networks. Server computers 102 and client computers 104 communicate with one another via any of a wide variety of known protocols, such as the Transmission Control Protocol (TCP) or User Datagram Protocol (UDP).

Multimedia servers 102 have access to streaming media content in the form of different media streams. These media streams can be individual media streams (e.g., audio, video, graphical, etc.), or alternatively composite media streams including multiple such individual streams. Some media streams might be stored as files 108 in a database or other file storage system, while other media streams 110 might be supplied to the server on a "live" basis from other data source components through dedicated communications channels or through the Internet itself.

The media streams received from servers 102 are rendered at the client computers 104 as a multimedia presentation, which can include media streams from one or more of the servers 102. These different media streams can include one or more of the same or different types of media streams. For example, a multimedia presentation may include two video streams, one audio stream, and one stream of graphical images. A user interface (UI) at the client computer 104 can allows users various controls, such as allowing a user to either increase or decrease the speed at which the media presentation is rendered.

Exemplary Computer Environment

In the discussion below, the invention will be described in the general context of computer-executable instructions, such as program modules, being executed by one or more conventional personal computers. Generally, program modules include routines, programs, objects, components, data structures, etc. perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. In a distributed computer environment, program modules may be located in both local and remote memory storage devices. Alternatively, the invention could be implemented in hardware or a combination of hardware, software, and/or firmware. For example, one or more application specific integrated circuits (ASICs) could be programmed to carry out the invention.

As shown in FIG. 3, a network system in accordance with the invention includes a network server(s) 102 from which a plurality of media streams are available. In some cases, the media streams are actually stored by server(s) 102. In other cases, server(s) 102 obtain the media streams from other network sources or devices. The system also includes network clients 104. Generally, the network clients 104 are responsive to user input to request media streams corresponding to selected multimedia content. In response to a request for a media stream corresponding to multimedia content, server(s) 102 streams the requested media streams to the network client 104 in accordance with an advanced streaming format (ASF), such as the WMA format. The client renders the data streams to produce the multimedia content.

Figure 4:
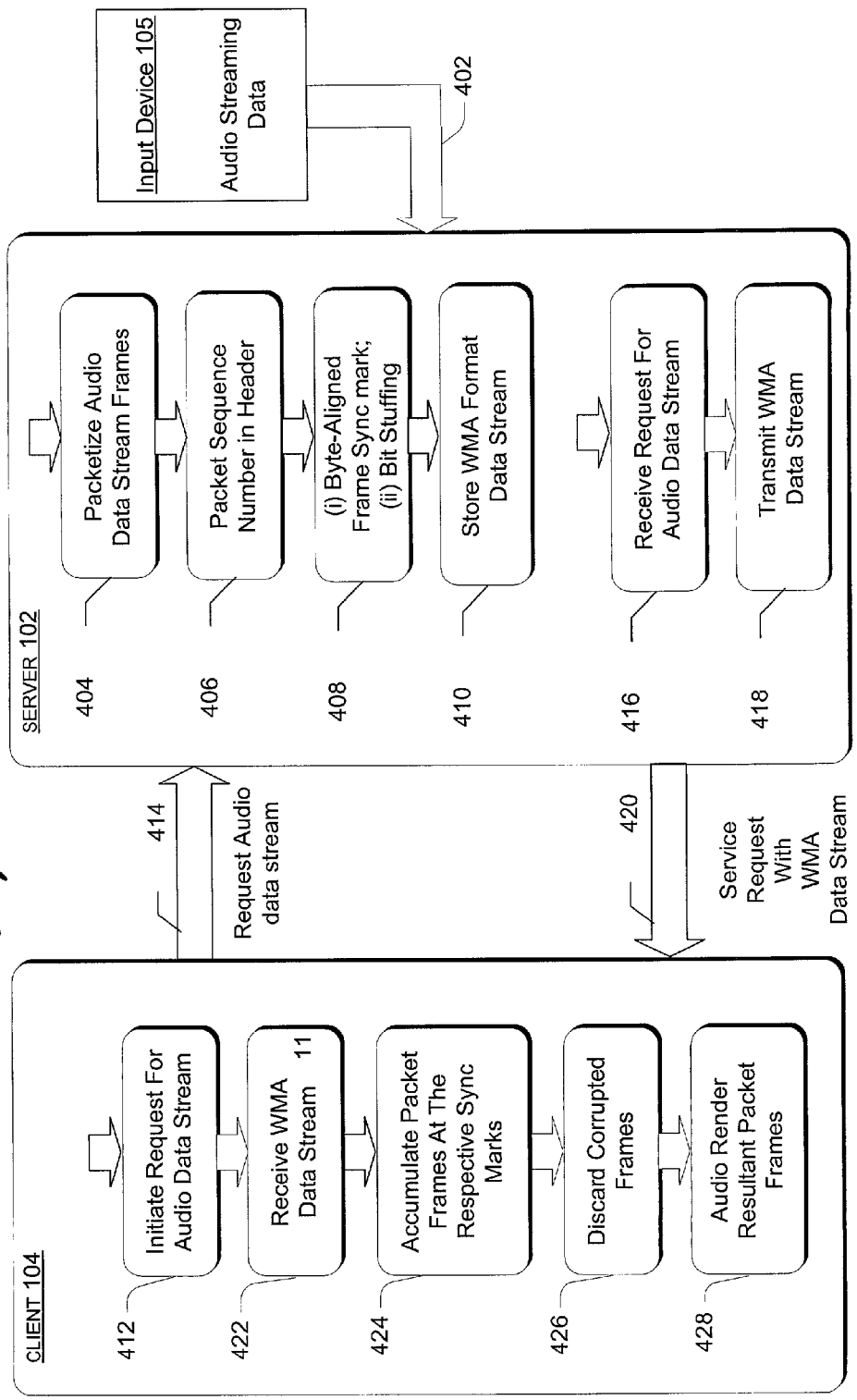
FIG. 4 is a block diagram, in accordance with an embodiment of the present invention, illustrating communications between a client and server in accordance with the invention, where the server serves to the client a requested WMA bitstream that the client can audio render.

FIG. 4 illustrates the input and storage of audio data on a server in the WMA format, as well communications between the server and a client in accordance with an embodiment of the present invention. By way of overview, the server receives input of an audio data stream. The server encodes the audio data stream using the encoder of the server's WMA codec. The WMA formatted data stream is then stored by the server. Subsequently, the client requests the corresponding audio data stream from the server. The server retrieves and transmits to the client the corresponding audio stream that the server had previously stored in the WMA format. The client decodes the WMA audio stream, which the client has received from the server, using the decoder of the client's WMA codec so as to perform audio rendering.

The flow of data in seen in FIG. 4 between and among blocks 402–428. At block 402, an input device 105 furnishes to server 102 input that includes audio streaming data. By way of example, the audio streaming data might be supplied to server 102 on a "live" basis by input device 105 through dedicated communications channels or through the Internet. The audio streaming data is supplied to the coder of the WMA codec at block 404 for placing frames of data into a data packet. At block 406, a packet sequence number is added by the coder to a data packet as the packet header.

At block 408, each frame in the data packet receives a consecutively preceding fourteen (14) zero bit sync mark (e.g. "00000000000000") from the encoder. Preferably, the coder will arrange for the sync mark to be padded with bits so that both the sync mark and the frame are byte-aligned. If fourteen (14) consecutive zeroes occur when multiple codes are concatenated together, the coder of the WMA codec stuffs a single occurrence of the "1" character among the codes to establish the uniqueness of the sync mark. The WMA data stream so constructed is then stored at block 410, such as in streaming data files 108 seen in FIG. 3.

Client 104 makes a request for an audio data stream at block 412 that is transmitted to server 102 as seen at arrow 414 in FIG. 4. At block 416, server 102 receives the request and transmits a corresponding WMA data stream as seen in blocks 418–420. The WMA data stream is received by client 104 at block 422. For each data packet at block 424, the decoder of the WMA codec in client 104 accumulates each frame at the respective sync mark. For each corrupted frame received by the decoder, the default values are substituted by the decoder for the two parameters in this frame, which are required by the next frame. The decoder can discard corrupted frames at block 426. At block 428, the decoder audio renders decompressed audio data streams.

Figure 5:
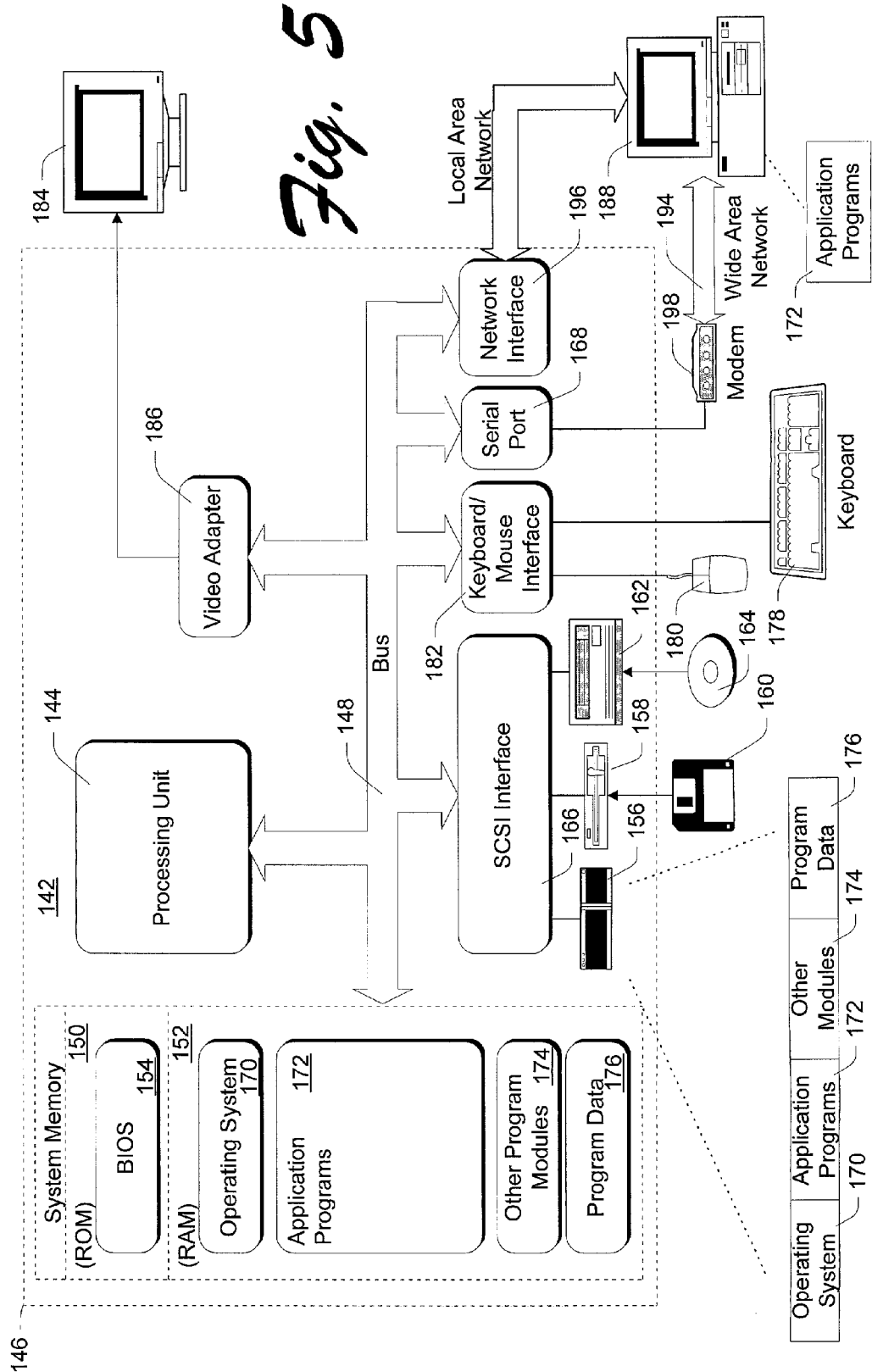
FIG. 5 is a block diagram, in accordance with an embodiment of the present invention, of a networked computer that can be used to implement either a server or a client.

FIG. 5 shows a general example of a computer 142 that can be used in accordance with the invention. Computer 142 is shown as an example of a computer that can perform the functions of any of client computers 102 or server computers 104 of FIG. 3. Computer 142 includes one or more processors or processing units 144, a system memory 146, and a system bus 148 that couples various system components including the system memory 146 to processors 144.

The bus 148 represents one or more of any of several types of bus structures, including a memory bus or memory controller, a peripheral bus, an accelerated graphics port, and a processor or local bus using any of a variety of bus architectures. The system memory includes read only memory (ROM) 150 and random access memory (RAM) 152. A basic input/output system (BIOS) 154, containing the basic routines that help to transfer information between elements within computer 142, such as during start-up, is stored in ROM 150. Computer 142 further includes a hard disk drive 156 for reading from and writing to a hard disk (not shown) a magnetic disk drive 158 for reading from and writing to a removable magnetic disk 160, and an optical disk drive 162 for reading from or writing to a removable optical disk 164 such as a CD ROM or other optical media.

Any of the hard disk (not shown), magnetic disk drive 158, optical disk drive 162, or removable optical disk 164 can be an information medium having recorded information thereon. The information medium has a data area for recording stream data using stream packets each of which includes a packet area containing one or more data packets. Each data packet includes a header and one or more frames. By way of example, each data packet is encoded and decoded by a codec executing in processing unit 144, such as a Microsoft® Windows Media™ Audio (WMA) codec. As such, the encoder distributes the stream data to the data packet areas in the stream packets so that the distributed stream data are recorded in the data packet areas using an encoding algorithm, such as is used by a WMA encoder. The encoder will preferably perform information recording such that each frame is preceded by and contiguous with a sync mark having a predetermined unique bit sequence that not used by the encoding algorithm to encode the stream data.

The hard disk drive 156, magnetic disk drive 158, and optical disk drive 162 are connected to the system bus 148 by an SCSI interface 166 or some other appropriate interface. The drives and their associated computer-readable media provide nonvolatile storage of computer readable instructions, data structures, program modules and other data for computer 142. Although the exemplary environment described herein employs a hard disk, a removable magnetic disk 160 and a removable optical disk 164, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 160, optical disk 164, ROM 150, or RAM 152, including an operating system 170, one or more application programs 172, other program modules 174, and program data 176. A user may enter commands and information into computer 142 through input devices such as keyboard 178 and pointing device 180. Other input devices (not shown) may include a microphone, joystick, game pad, satellite dish, scanner, or the like. These and other input devices are connected to the processing unit 144 through an interface 182 that is coupled to the system bus. A monitor 184 or other type of display device is also connected to the system bus 148 via an interface, such as a video adapter 186. In addition to the monitor, personal computers typically include other peripheral output devices (not shown) such as speakers and printers.

Computer 142 operates in a networked environment using logical connections to one or more remote computers, such as a remote computer 188. The remote computer 188 may be another personal computer, a server, a router, a network PC, a peer device or other common network node, and typically includes many or all of the elements described above relative to computer 142, although only a memory storage device 190 has been illustrated in FIG. 5. The logical connections depicted in FIG. 5 include a local area network (LAN) 192 and a wide area network (WAN) 194. Such networking environments are commonplace in offices, enterprise-wide computer networks, intranets, and the Internet. In the described embodiment of the invention, remote computer 188 executes an Internet Web browser program such as the Internet Explorer® Web browser manufactured and distributed by Microsoft Corporation of Redmond, Wash.

When used in a LAN networking environment, computer 142 is connected to the local network 192 through a network interface or adapter 196. When used in a WAN networking environment, computer 142 typically includes a modem 198 or other means for establishing communications over the wide area network 194, such as the Internet. The modem 198, which may be internal or external, is connected to the system bus 148 via a serial port interface 168. In a networked environment, program modules depicted relative to the personal computer 142, or portions thereof, may be stored in the remote memory storage device. It will be appreciated that the network connections shown are exemplary and other means of establishing a communications link between the computers may be used.

Generally, the data processors of computer 142 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

APPENDIX

[049] Part A: searching for a sync mark at the beginning of a frame in a data packet

```
int SearchSyncMark()
{
    int  code ;
    int  cbMoved = 0 ;
    While ( ! eof (bitstream) )
    {
        Peek 14 bits from the bitstream to code;
        If ( 0 = = code )
            Return cbMoved ;
        Else
        {
            Move the bitstream pointer to next byte;
            cbMoved ++ ;
        }
    }
    return -1 ;
}
```

[050] Part B: Bit stuffing procedure – stuffing the "1" bit

The input parameter is $cMaxZeroBitsBegin$.

```
Void ReadStuffingBit ( Int cMaxZeroBitsBegin)
{
        if ( cZeroBitsEnd + cMaxZeroBitsBegin >= 14 )
        {
                Read 1 bit from the bitstream;
                cZeroBitsEnd = 0 ;
        }
}
```

[051] Part C: Update *cZeroBitsEnd*:

Assume that the value of the code is *nSymbol*, and its length is *nSymbolLen*

```
Void UpdateEndingZeros ( Int nSymbol, Int nSymbolLen)
{
        if ( 0 = = nSymbol )
        {
                cZeroBitsEnd += nSymbolLen ;
        }
        else
        {
                cZeroBitsEnd = 0 ;
                for ( Int i=0 ; i < nSymbolLen ; i ++ )
                {
                        if ( nSymbol & 0x1 )
                                break ;
                        else
                        {
                                cZeroBitsEnd ++ ;
                                nSymbol >> = 1 ;
                        }
                }
        }
}
```

What is claimed is:

1. A method to encode streaming data into data packets with an encoding algorithm, wherein each said data packet includes a packet header and one or more frames, said method comprising the steps of:
   forming the streaming data into a plurality of data packets using the encoding algorithm, wherein the encoding algorithm comprises a coder/decoder;
   forming, contiguous with and preceding each said frame, a predetermined unique bit sequence that is not used in the encoding algorithm to encode the streaming data;
   examining a combination of:
      a fragment of one said frame; and
      a fragment of the predetermined unique bit sequence that is a contiguous with and following said fragment of one said frame;
   when the combination contains a bit sequence that is identical to the predetermined unique bit sequence, placing a stuffing bit into said fragment of one said frame, whereby the combination does not contain a bit sequence that is identical to the predetermined unique bit sequence.

2. The method as defined in claim 1, further comprising aligning to a respective byte each said frame in the placing one or more stuffing bits into an end portion thereof.

3. A computer-readable medium having computer-executable instructions, which when executed on a processor, direct a computer to perform the steps of claim 1.

4. A method to encode streaming data into data packets with an encoding algorithm, wherein each said data packet includes a packet header and one or more frames, said method comprising the steps of:
   forming the streaming data into a plurality of data packets using the encoding algorithm, wherein the encoding algorithm comprises a coder/decoder;
   forming, contiguous with and preceding each said frame, a predetermined unique bit sequence that is not used in the encoding algorithm to encode the streaming data;
   forming the packet header of each said data packet to be contiguous with the predetermined unique bit sequence preceding the first of said one or more frames.

5. The method as defined in claim 4, wherein the packet header consists of a packet sequence number respective to other said data packets.

6. A method to encode audio streaming data in data packets with a coder/decoder, wherein each said data packet includes a packet header and one or more frames, said method comprising the steps of:
   forming a plurality of data packets with the coder/decoder from the audio streaming data; and
   forming, contiguous with and preceding each said frame, a bit string that is not used by a encoder to encode a data stream, wherein each said frame is between contiguous fourteen zero bit strings; and
      examining a combination of a fragment of one said frame and a contiguous following fragment of a fourteen zero bit string; and
   when the combination contains a fourteen zero bit string, placing a non-zero stuffing bit into the fragment of one said frame, whereby the combination does not contain a fourteen zero bit string.

7. The method as defined in claim 6, further comprising aligning to a respective byte each said frame in the placing one or more zero stuffing bits into an end portion thereof, whereby each said frame is byte aligned.

8. A computer-readable medium having computer-executable instructions, which when executed on a processor, direct a computer to perform the steps of claim 6.

9. A method to encode audio streaming data in data packets with a coder/decoder, wherein each said data packet includes a packet header and one or more frames, said method comprising the steps of:
   forming a plurality of data packets with the coder/decoder from the audio streaming data;
      forming, contiguous with and preceding each said frame, a bit string that is not used by a encoder to encode a data stream;
      forming the packet header of each said data packet to be contiguous with a fourteen zero bit string preceding the first of said one or more frames.

10. The method as defined in claim 9, wherein the packet header consists of a packet sequence number respective to other said data packets.

11. A method to encode streaming data with an encoding algorithm into data packets each said including a packet header and one or more frames, the method comprising the steps of:
   forming the streaming data into a plurality of data packets using the encoding algorithm, wherein the encoding algorithm comprises a coder/decoder;
   forming, contiguous with and preceding each said frame, a predetermined unique bit sequence that is not used in the encoding algorithm to encode the streaming data;
   forming the packet header of each said data packet to be contiguous with the predetermined unique bit sequence of the first said frame of said one or more frames;
   aligning to a respective byte each said frame by placing one or more stuffing bits into an end portion thereof;
   examining a combination of:
      a fragment of one said frame; and
      a fragment of the predetermined unique bit sequence that is a contiguous with and following said fragment of one said frame;
   when the combination contains a bit sequence that is identical to the predetermined unique bit sequence, placing a stuffing bit into said fragment of one said frame, whereby the combination does not contain a bit sequence that is identical to the predetermined unique bit sequence.

12. The method as defined in claim 11, wherein the packet header consists of a packet sequence number respective to other said data packets.

13. A computer-readable medium having computer-executable instructions, which when executed on a processor, direct a computer to perform the steps of claim 11.

14. A method of recording information on an information medium which has a data area for recording streaming data using stream packets each of which includes a packet area containing one or more data packets, each data packet including a header and one or more frames, said method comprising the steps of:
   distributing the streaming data to the data packet areas in the stream packets so that the distributed streaming data are recorded in the data packet areas using an encoding algorithm, the encoding algorithm comprising a coder/decoder, wherein information recording is performed such that each said frame is preceded by and contiguous with a sync mark having a predetermined unique bit sequence that not used by the encoding algorithm to encode the streaming data;

examining a combination of a fragment of the sync mark of one said frame with a contiguous fragment of the respectively previous said frame; and when the combination contains a bit sequence that is identical to the predetermined unique bit sequence placing a stuffing bit into said contiguous fragment of the respectively previous said frame, whereby the combination does not contain a bit sequence that is identical to the predetermined unique bit sequence.

15. The method as defined in claim 14, further comprising aligning each said frame with a respective byte by placing one or more stuffing bits into an end portion thereof.

16. A computer-readable medium having computer-executable instructions, which when executed on a processor, direct a computer to perform the steps of claim 14.

* * * * *